No. 815,220. PATENTED MAR. 13, 1906.
H. RUST.
CORN HUSKER.
APPLICATION FILED SEPT. 12, 1904.
3 SHEETS—SHEET 1.
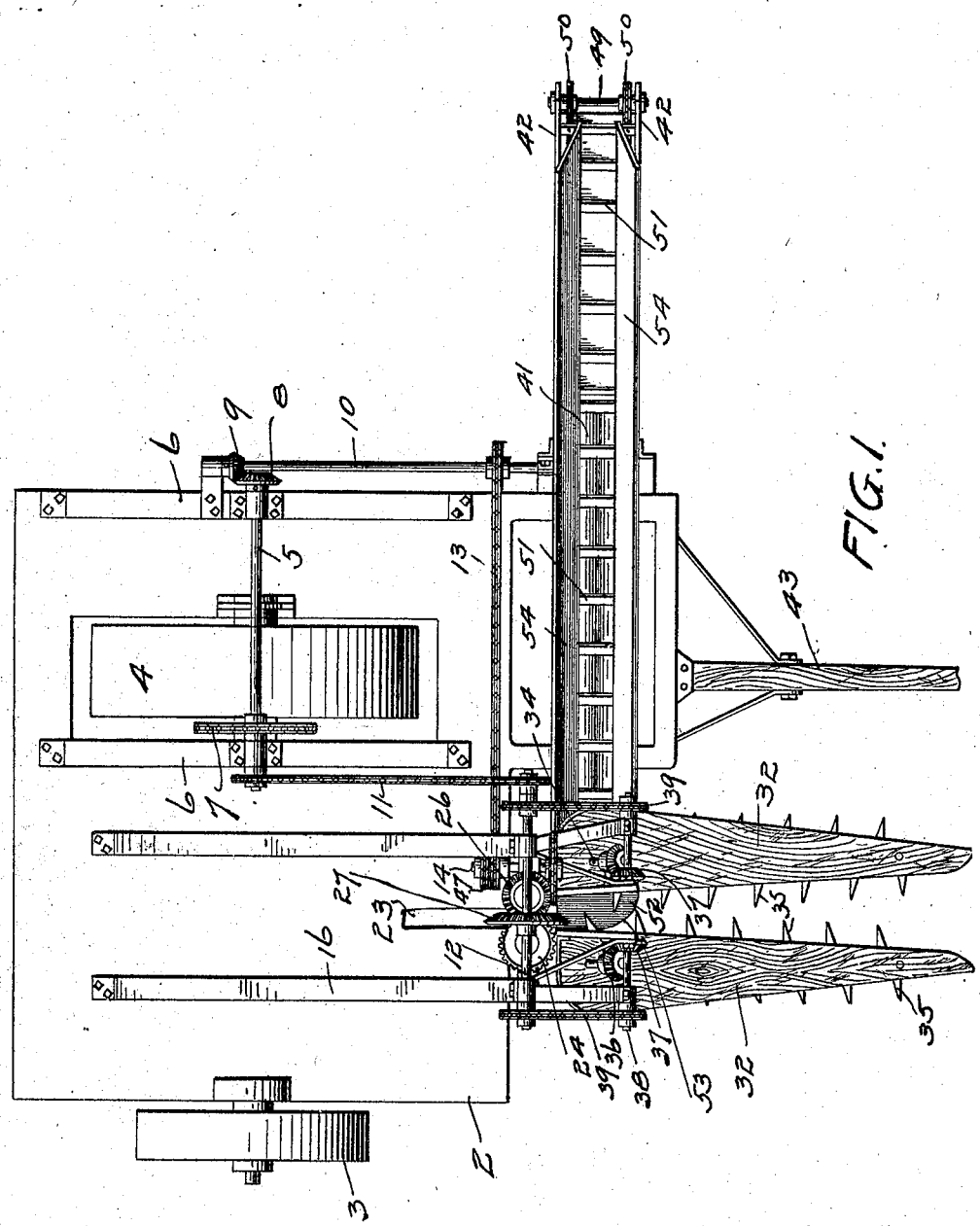
FIG. I.
WITNESSES
INVENTOR
HENRY RUST
BY
HIS ATTORNEY

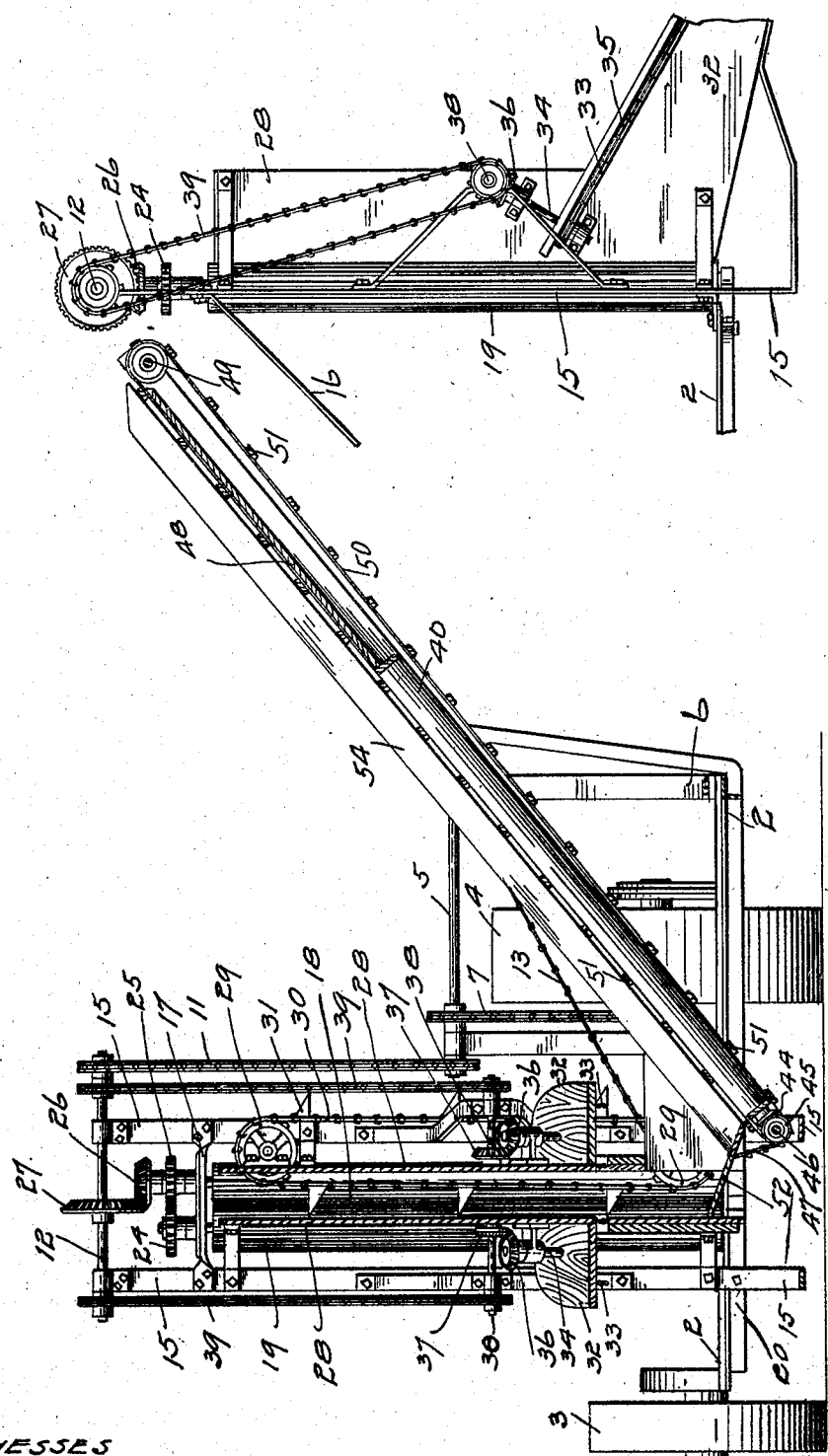

No. 815,220. PATENTED MAR. 13, 1906.
H. RUST.
CORN HUSKER.
APPLICATION FILED SEPT. 12, 1904.
3 SHEETS—SHEET 3.
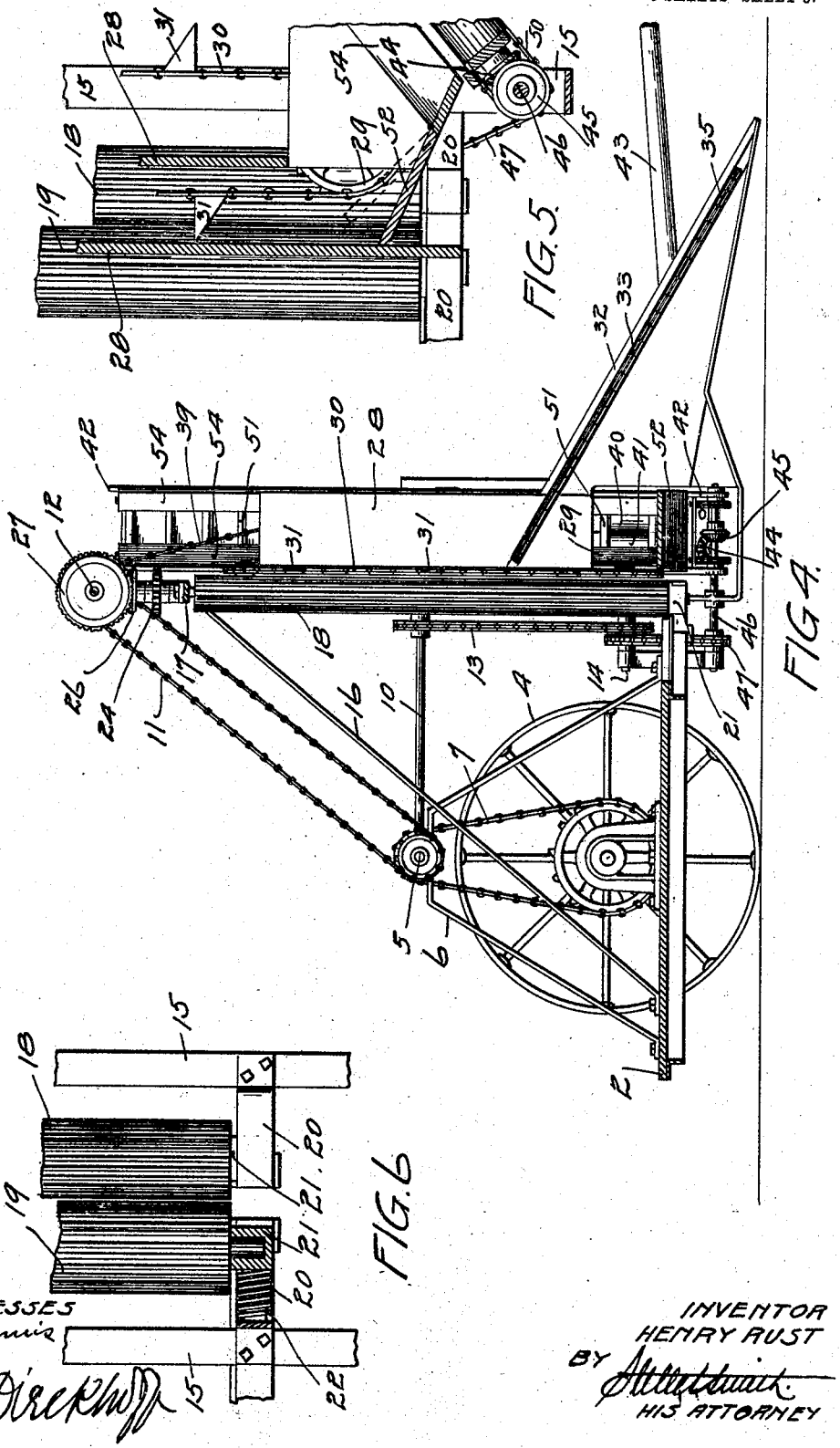
WITNESSES
INVENTOR
HENRY RUST
BY
HIS ATTORNEY

UNITED STATES PATENT OFFICE.

HENRY RUST, OF WORTHINGTON, MINNESOTA.

CORN-HUSKER.

No. 815,220.     Specification of Letters Patent.     Patented March 13, 1906.

Application filed September 12, 1904. Serial No. 224,108.

*To all whom it may concern:*

Be it known that I, HENRY RUST, of Worthington, Nobles county, Minnesota, have invented certain new and useful Improvements in Corn-Huskers, of which the following is a specification.

My invention relates to machines designed to gather and husk the ears of standing corn; and the object of the invention is to provide a machine of light draft, but strong and durable in construction, by means of which the ears of corn can be easily and quickly stripped from the stalks and thoroughly husked.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of the corn-husker embodying my invention. Fig. 2 is a front elevation, partially in section, showing the position of the operating mechanism. Fig. 3 is a detail showing the mechanism for driving the belts that straddle the corn rows. Fig. 4 is a vertical section illustrating the manner of driving the stripping-rolls from the traction-wheel. Fig. 5 is a detail of the mechanism for conducting the standing stalks to the stripping-rolls and separating the ears from the stalks and directing them to the husking-conveyer. Fig. 6 is a detail of the stripping-rolls, showing the yielding bearings therefor.

In the drawings, 2 represents a platform supported upon the carrying-wheel 3 and the traction-wheel 4. A shaft 5 is mounted on brackets 6 above the wheel 4 and driven from said wheel through a sprocket-chain 7. One end of the shaft 5 is provided with a beveled gear 8, meshing with a gear 9 on a shaft 10, and a chain belt 11 connects the opposite end of the shaft 5 with a shaft 12. A belt 13 connects the shaft 10 and a short shaft 14, mounted in bearings near the platform 2.

Upon the forward end of the platform 2 I arrange standards 15, held in an upright position by braces 16 and supporting the shaft 12. The standards 15 are connected by a cross-bar 17, wherein the upper ends of the vertical corrugated stripping-rolls 18 and 19 are journaled. The lower ends of these rolls are journaled in arms 20, secured to the standards 15, and said ends are arranged to slide in said arms by means of bearing-blocks 21 and springs 22 to allow the rolls to separate when the cornstalks pass between them. These rolls are preferably of different diameter to allow the ear-stripping knives or fingers to be set in close to the surface of the smaller roll and operate upon the surface of the larger roll. In the rear of the stripping-rolls the platform 2 is provided with a slot 23, through which the cornstalks are drawn as the machine passes over the row. The stripping-rolls are provided with gears 24 and 25, meshing with one another, and one of the rolls has a beveled gear 26, meshing with a similar gear 27 on the shaft 12. Vertical guide-boards 28 are arranged in advance of the stripping-rolls and near the same to aid in directing the cornstalks between them. In front of the smaller roll and near the top and bottom of the same I arrange sprocket-wheels 29, connected by a belt 30, on which at intervals knives or fingers 31 are secured. These knives or fingers are arranged to travel vertically in front of the stripping-rolls and near the surface of the larger one, and their function is to separate those ears from the stalks that are not stripped off by the action of the rolls. The lower sprocket-wheel 29 is mounted on the shaft 14 and may be driven at any suitable speed, according to the amount of work to be done.

In front of the stripping-rolls I provide arms 32, tapered, preferably, from their rear toward their forward ends and adapted to straddle a corn row. Within these arms I arrange belts 33, driven from shafts 34 near the stripping-rolls and provided with fingers 35, which project into the space between the arms 32 and serve to hold the cornstalks in an upright position and insure the proper feed of the same toward the rolls. The shafts 34 are provided with gears 36, meshing with similar gears 37 on shafts 38, that are driven from the shaft 12 through belts 39.

The husking-rolls, preferably two in number, are arranged at an incline substantially at right angles to the direction of the movement of the machine to effect a side delivery of the ears of corn into a wagon or other receptacle provided for the purpose. These husking-rolls, which I will designate by reference-numerals 40 and 41, are supported in a frame 42, mounted upon the forward end of the platform 2 in the rear of the draft appliance 43. The roll 41 at its lower end is provided with gear 44, meshing with a gear 45 on a shaft 46, that is driven through a belt 47 from the shaft 14. A platform 48 is provided at the outer end of the husking-roll frame, forming a continuation of the surface of the rolls. A shaft 49 is mounted in the outer end of the husking-roll frame, and belts 50 connect the shaft 49 with the shaft 46. The belts 50 are connected by slats 51, which sweep over the surface of the husking-rolls and the platform 48 and gather up and carry along the husked ears of corn and discharge them into the wagon beneath the outer end of the husking-roll frame.

To direct the ears of corn upon the husking-rolls, I prefer to provide a plate 52, hinged at one edge in front of the stripping-rolls and having a rounded forward edge 53 in the path of the cornstalks. When this edge is struck by the incoming cornstalk, the plate will be raised, allowing the stalk to pass, and then the plate will drop down to its normal position in front of the stalk, and when the ear has been stripped therefrom it will fall upon the plate 52, the inclination of which will direct the ear into the husking-rolls. I prefer also to provided guide-boards 54 on each side of the husking-rolls for the purpose of directing the ears of corn to the proper position to be husked.

The operation of the machine is as follows: The apparatus having been set in motion across the field, with the arms 32 straddling a row of corn, the stalks will strike the plate 52 and lifting the same will pass behind it and be engaged by the stripping-rolls and the ears of corn snapped off, those having very tough tenacious stems being stripped or separated by the action of the vertically-moving knives or fingers. The stripping-rolls will yield sufficiently to allow the stalks to pass between them, while the ears will fall upon the plate 52 and be guided thereby to the husking-rolls. The guide-boards will direct the ears of corn to the space between the husking-rolls, and the husks caught between the surfaces of the rolls will be stripped from the ears as they are fed upward by the moving carrier. By the time the ear reaches the top of the rolls the husks will all be removed and ready for delivery to the wagon or bin. The stalks from which the ears have been stripped will pass between the vertical rolls into the slot 23 and from thence under the platform 2, which passes over them.

I claim as my invention—

1. The combination, with a wheeled frame, of stripping-rolls vertically arranged thereon, mechanism for driving said rolls, arms provided in advance of said rolls, belts having fingers operating lengthwise of said arms, husking-rolls arranged at an incline, a hinged plate in front of said stripping-rolls and adapted to be raised by the engagement of the cornstalk therewith, and said plate being inclined downward toward said husking-rolls to direct the ear of corn thereon, substantially as described.

2. The combination, with a wheeled frame, of stripping-rolls vertically arranged thereon and revolving toward each other, one of said rolls being of greater diameter than the other, arms arranged to straddle the corn row and direct the stalks to said rolls, and a belt operating vertically near the smaller of the two stripping-rolls, and provided with knives or fingers arranged to pass near the surface of the larger roll, substantially as described.

3. In a corn-husker, the combination, with a wheeled frame, of upright stripping or snapping rolls mounted thereon, means for guiding the stalks to said rolls, husking-rolls arranged at an incline in front of said stripping-rolls and extending laterally with respect thereto, the lower receiving ends of said husking-rolls being contiguous to the lower ends of said stripping-rolls, and means for directing the ears of corn stripped from the stalks by said first-named rolls to the receiving ends of said husking-rolls, substantially as described.

4. The combination, with a wheeled frame, of stripping-rolls vertically arranged thereon, means for guiding the cornstalks to said rolls, husking-rolls provided near said stripping-rolls, a hinged plate arranged in advance of said stripping-rolls and adapted to direct the ears of corn to the receiving ends of said husking-rolls, substantially as described.

5. In a corn-husker, the combination, with a wheeled frame, of upright stripping-rolls mounted therein, and fingers traveling along in front of and close to said stripping-rolls for snapping off the ears of corn that do not readily yield to the action of said stripping-rolls, substantially as described.

6. The combination, with a wheeled frame, of corrugated vertically-arranged stripping-rolls, mechanism for guiding the stalks of corn thereto, and a belt operating vertically in front of one of said rolls and having a series of fingers that sweep past the surface of the other roll.

7. The combination, with a wheeled frame, of vertically-arranged stripping-rolls carried thereby, means for feeding the cornstalks to said rolls, a belt provided with a series of fingers operating vertically in front of one of said rolls, and a vertically-arranged guide-board provided in advance of said rolls, substantially as described.

8. The combination, with a suitable frame, of stripping-rolls vertically arranged thereon, husking-rolls arranged at an incline and extending laterally with respect to said stripping-rolls the receiving ends of said husking-rolls being near and below the level of the lower ends of said stripping-rolls, means for guiding the stalks of corn to said stripping-rolls, and a pivoted plate arranged to direct the ears of corn from said stripping to said husking rolls.

9. The combination, with a platform having a slot in its forward edge and provided with suitable carrying-wheels, of vertically-arranged stripping-rolls mounted in front of said slot, means arranged to direct the stalks of corn to said rolls, husking-rolls arranged in advance and at one side of said stripping-rolls and inclined upwardly toward the side of the machine the lower ends of said husking-rolls being near the corresponding ends of said stripping-rolls and adapted to receive the unhusked ears of corn therefrom, substantially as described.

10. The combination, with a platform provided with carrying-wheels, of a shaft mounted in bearings above one of said wheels and geared thereto, stripping-rolls arranged vertically on the forward part of said platform and having operative connections with said shaft to be driven thereon, guiding-arms provided in advance of said stripping-rolls, husking-rolls arranged at an incline in advance of said stripping-rolls and extending laterally with respect thereto, the receiving ends of said husking-rolls being near said stripping-rolls, and said husking-rolls having driving connections with said-shaft, substantially as described.

11. In a corn-husker, the combination, with a wheeled frame, of upright stripping-rolls mounted thereon, means for guiding the stalks of corn to said stripping-rolls, means operating in front of said stripping-rolls to snap or break off the tough stems connecting the ears and stalks, inclined husking-rolls arranged in front of said stripping-rolls and extending laterally with respect thereto and having their lower ends contiguous to said stripping-rolls to receive the unhusked ears of corn therefrom, substantially as described.

12. In a corn-husker, the combination, with a wheeled frame, of upright stripping or snapping rolls mounted thereon, means for guiding the stalks of corn to said snapping-rolls, husking-rolls provided in advance of said snapping-rolls and upwardly inclined therefrom and having their lower ends contiguous to the lower ends of said snapping-rolls, the unhusked ears of corn passing to said husking-rolls without passing through or between said snapping-rolls, and means for guiding said ears of corn into said husking-rolls, substantially as described.

13. In a corn-harvester, the combination with upright snapping-rolls, of husking-rolls arranged contiguous to the lower ends of the snapping-rolls, and an inclined platform for conducting the ears from the snapping-rolls to the husking-rolls.

14. In a corn-harvester, the combination with snapping-rolls, of husking-rolls, and a yieldingly-supported platform arranged in the interval between the contiguous portions of the snapping and husking rolls.

15. In a corn-harvester, the combination with snapping-rolls, of husking-rolls, and a yielding inclined platform arranged in the interval between the contiguous portions of the snapping and husking rolls.

In witness whereof I have hereunto set my hand this 30th day of August, 1904.

HENRY RUST.

In presence of—
S. S. SMITH,
O. W. DIECKHOFF.